Jan. 2, 1934.  M. LANDRIN  1,941,945
DEVICE FOR TRANSFORMING MOTOR TRUCKS AND SIMILAR VEHICLES INTO WINCHES
Filed March 3, 1932  2 Sheets-Sheet 1
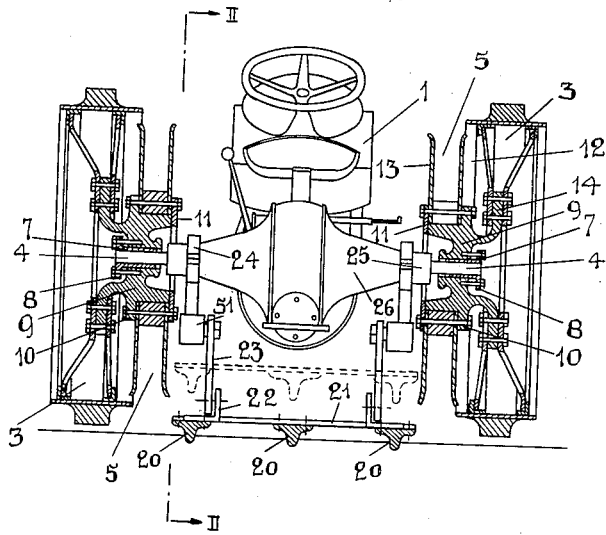
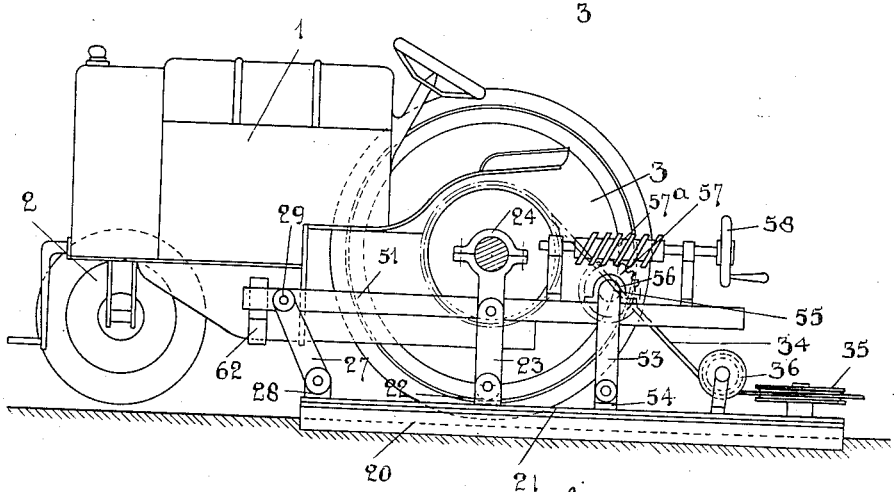
Inventor
M. Landrin
By C. F. Wenderoth
Atty.

Jan. 2, 1934.    M. LANDRIN    1,941,945
DEVICE FOR TRANSFORMING MOTOR TRUCKS AND SIMILAR VEHICLES INTO WINCHES
Filed March 3, 1932    2 Sheets-Sheet 2
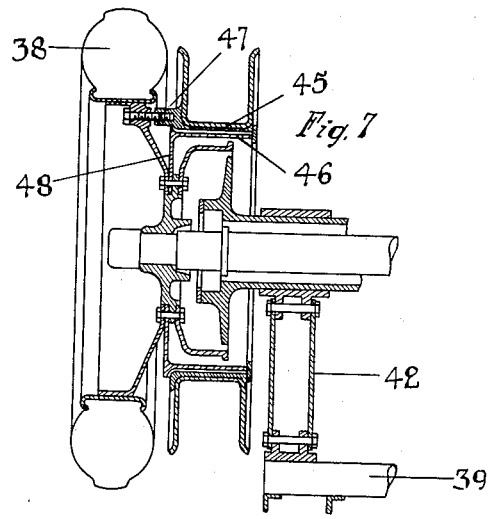
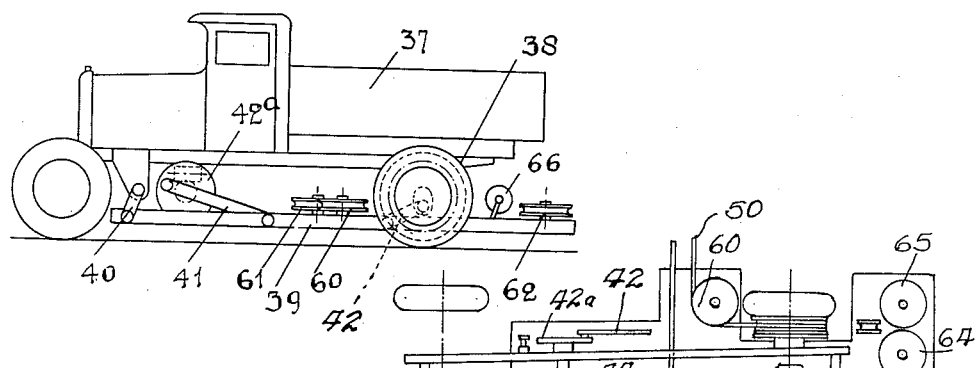
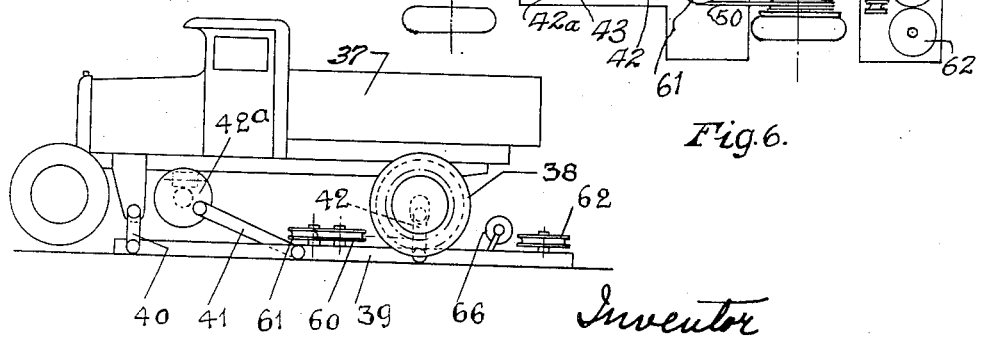
Inventor
M. Landrin
By C. F. Wenderoth
Atty.

Patented Jan. 2, 1934

1,941,945

UNITED STATES PATENT OFFICE 1,941,945

DEVICE FOR TRANSFORMING MOTOR TRUCKS AND SIMILAR VEHICLES INTO WINCHES

Marcel Landrin, Paris, France

Application March 3, 1932, Serial No. 596,615, and in France March 13, 1931

6 Claims. (Cl. 254—166)

My invention concerns a device for transforming motor trucks and similar vehicles into winches for hauling loads, for agriculture and other purposes. The arrangement according to my invention consists in fixing to the driving wheels, or to the driving axles, of the vehicle winding drums of suitable diameter, and in providing a false frame adapted to be lowered or raised and which serves to anchor the vehicle in the ground. Said false frame, when it is in the lowered position, lifts the vehicle above the ground so that the driving wheels of the vehicle are free to rotate and the drums fixed to said wheels may be immediately used for hauling a load, by utilizing the same transmission as for the displacements of the vehicle. Furthermore, the anchoring stresses and the torsional stresses, which, otherwise, would be transmitted to the vehicle, are entirely absorbed by the false frame.

The winding drums of the winch are mounted, in any suitable manner, on the driving wheels or on the driving axles. According to a preferred embodiment, the winding drums of the winch are of a smaller diameter than the driving wheels, which results in a reduction of the relative speed of travel of the cable and accordingly in an increase of the tractive stress exerted on said cable.

The false frame carries the turn-pulleys and the guiding pieces that are necessary for suitably directing the cable with respect to the winding drums of the winch. The lowering or the raising of the false frame may be obtained through any desired means, for instance by means of links or rods pivoted to the false frame and eccentrically mounted on plates or discs which are suitably rotated. The false frame may also be lowered or raised through hydraulic controlling means.

Preferred embodiments of my invention will be hereinafter described with reference to the accompanying drawings, given merely by way of example, and in which:

Fig. 1 is a back view of a tractor fitted with the device according to my invention, the essential parts of the device according to the invention being shown in section by a plane passing through the axis of the driving axle;

Fig. 2 is a sectional view on the line 2—2 of Fig. 1;

Fig. 3 is a sectional view of another embodiment of the device according to my invention in which each driving wheel is fitted with two winding drums;

Fig. 4 is an elevational view of a motor truck fitted with the device according to the invention, the false bottom being in the raised position;

Fig. 5 is an elevational view of the same motor truck, the false frame being lowered for the operation of the winch;

Fig. 6 is a plan view of the same automobile truck;

Fig. 7 is a detail view showing how the winding drum of the winch is fitted on the driving wheel of the automobile truck.

The tractor shown in Figs. 1 and 2 comprises, in the ordinary way, a frame 1 supported by front wheels 2, which serve to steer the vehicle, and driving rear wheels 3. The wheels 3 and the winding drums 5 of the winch are mounted on journals 4 as follows:

Rings 7 provided with a shoulder 8 are forced upon the axles. Said shoulders 8 serve to secure, by means of nuts, annular pieces or hubs 9 previously slipped over each axle. Said annular pieces 9 are provided each with a shoulder 10 which serves, in combination with a removable disc 11, to fix the sides 12 and 13 of drums 5. Annular pieces 9 further comprise shoulders 14, which serve for the fixation of the driving wheels 3.

The false frame consists of a plurality of longitudinal sectional irons 20 secured to transverse flat bars or sectional irons 21, which are themselves made integral with angle irons 22 to which links 23 are pivoted. Said links 23 are pivoted at their other ends to longitudinal sectional irons 51, fixed, on the one hand, through straps 24, to the longitudinal ends 25 of the differential gear casing 26, and, on the other hand to a part 62 integral with the frame of the tractor. Furthermore, the false frame is connected to longitudinal sectional irons 51 through links 27 pivoted at 29 to said sectional irons 51, and the other ends of which are pivotally mounted on angle irons 28 integral with the false frame. Two other links 53, pivoted to angle irons 54 secured to the false frame, are rigidly connected to a shaft 55 journalled in bearings 56 carried by longitudinal sectional irons 51. These two links serve to lower or to raise the false frame. To this effect, a toothed wheel 57 is keyed on shaft 55; said wheel meshes with an endless screw 57a which may, for instance be actuated by a control wheel 58 which can be operated either manually or through any suitable means, for instance hydraulic means.

When the false frame is lowered, links 23 and 53 are vertical, and by lifting the tractor, they support the wheels, which are above the ground (position shown in Figs. 1 and 2). The winding drums 5 of the winch may then be utilized for hauling loads by means of cables 34. Said cables pass around pulleys 35 and 36 which give them the suitable direction in order that they may be tangentially disposed with respect to the winding drums of the winch.

Cables 34 are wound around the drums of the winch and their tensions are always equal owing to the differential gear of the tractor, which balances their tractive stresses.

In order to obtain the to and fro operation of the tractor, for instance for ploughing, winding drums 6 may be fitted on wheels 3, in combination with winding drums 5 (Fig. 3). In that case, the shoulders 14 of annular pieces 9 serve for the fixation of cylindrical pieces 15 provided with a shoulder 16. Said shoulder serves, in combination with a removable disc 17, to maintain the sides 18 and 19 of winding drums 6. Owing to that arrangement, the tractor may be utilized as a winch for to and fro work with a pulley or a drum serving to the return of the hauling cable. For hauling the load, for instance for hauling a plough, drums 5 are utilized, and for the return of the cable, for instance for the return course of the plough, drums 6 are utilized in turn.

In the embodiment shown in Figs. 4, 5 and 6, showing a motor truck fitted with the device according to my invention, said truck 37 comprises winding drums mounted on driving wheels 38, for instance in the same way as hereinafter described with reference to Fig. 7. The false frame 39 is connected to the frame of the vehicle by couples of links 40, 41 and 42. Links 41, which are intended to lower or raise the false frame, are eccentrically pivoted to discs 42a which are rotated for instance through an endless screw meshing with a toothed wheel keyed on shaft 44 on which are keyed said discs 42a. When the false frame is raised, (Fig. 4) the wheels rest on the ground and the vehicle can move on the ground. When the false frame is lowered, (Fig. 5) links 40 and 42 are brought into a vertical position and they lift the truck so that the wheels no longer rest on the ground. The winding drums of the winch can then be utilized for hauling loads by means of cables 50.

In the mode of fitting the wheels illustrated in Fig. 7, the winding drums 45 of the winch are mounted loose on rings 46, so as to allow unwinding cables 50, or they can be made integral with wheels 38 through catch pins 47 or other coupling means, for winding the cables so as to haul a load. As shown in the drawings, rings 46 can be secured to a removable disc 48 of the type used for removable wheels.

In the false frame shown in Figs. 4 to 6, I have shown pulleys 60 and 61 for hauling loads in a transverse, or substantially transverse direction with respect to the motor truck. I have also provided, in the rear part of the false frame, pulleys 62, 63, 64 and 65 which are intended to be used for hauling loads from the rear of the truck or the sides thereof or from any other intermediate direction. Cables 50 are suitably guided with respect to the winding drums of the winch through guiding pulleys 66.

While I have disclosed what I deem to be a practical and efficient embodiment of my invention, it should be well understood that I do not wish to be limited thereto as there might be changes made in the arrangement, disposition and form of the parts without departing from the principle of my invention as comprehended within the scope of the appended claims.

What I claim is:

1. In a motor vehicle having a frame, two driving wheels journalled on said frame, a device for rapidly transforming said vehicle into a motor winch which comprises in combination, winding drums fixed to the driving wheels of the vehicle respectively, cables adapted to cooperate with said winding drums respectively, a false frame adapted to be lowered and raised with respect to said frame of the vehicle so as to lift all of the wheels of the vehicle above the ground when it is in its lowered position, and a plurality of turn pulleys and guiding pulleys for said cables pivoted to said false frame.

2. In a motor vehicle having a frame and wheels journalled on said frame, a device for rapidly transforming said vehicle into a motor winch which comprises in combination, winding drums fixed to the driving wheels of the vehicle respectively, cables adapted to cooperate with said winding drums respectively, a false frame adapted to be lowered and raised with respect to said frame of the vehicle so as to lift all of the wheels of the vehicle above the ground when it is in its lowered position, at least two horizontal pulleys mounted at the rear of the vehicle, and at least two horizontal pulleys disposed one ahead of the other in the middle part of the vehicle for guiding said cables, whereby loads can be hauled from a transverse direction or from the rear or from any intermediate direction.

3. In a motor vehicle having a frame and at least two driving wheels mounted on said frame, a device for rapidly transforming said vehicle into a motor winch, which comprises in combination, two winding drums fixed with respect to said driving wheels, two cables adapted to cooperate with said drums respectively, a false frame substantially parallel to said frame of the vehicle, a plurality of links pivoted each at one end to said false frame and at the other end to said frame of the vehicle, a transverse shaft journalled on said frame of the vehicle, means for operatively connecting said shaft to two of said links disposed on either side of said frame, and means for rotating said shaft.

4. In a motor vehicle having a frame and at least two driving wheels mounted on said frame, a device for rapidly transforming said vehicle into a motor winch, which comprises in combination, two winding drums fixed with respect to said driving wheels, two cables adapted to cooperate with said drums respectively, a transverse shaft journalled on said frame of the vehicle, a plurality of links pivoted each at one end to said false frame and at the other end to said frame of the vehicle, two of said links, disposed on either side of said frame, being keyed to said shaft, a worm wheel keyed to said shaft, a worm adapted to mesh with said worm wheel, and means for rotating said worm.

5. In a motor vehicle having a frame and at least two driving wheels mounted on said frame, a device for rapidly transforming said vehicle into a motor winch, which comprises in combination, two winding drums fixed with respect to said driving wheels, two cables adapted to cooperate with said drums respectively, a plurality of links pivoted each at one end to said false frame and at the other end to said frame of the vehicle, a transverse shaft journalled on said frame of the vehicle, a disk keyed to said shaft, a link eccentrically pivoted at one end to said disc and at the other end to said false frame, and means for rotating said shaft.

6. A device according to claim 5 in which the means for rotating said shaft comprise, a worm wheel keyed on said shaft, and a worm adapted to mesh with said worm wheel.

MARCEL LANDRIN.